March 3, 1970   J. F. LOGAN ET AL   3,498,546
SINK SPRAY
Filed March 4, 1968   2 Sheets-Sheet 2
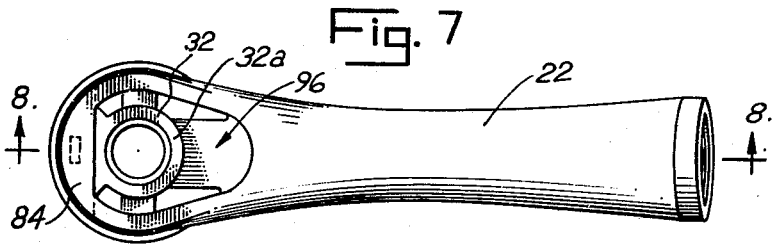
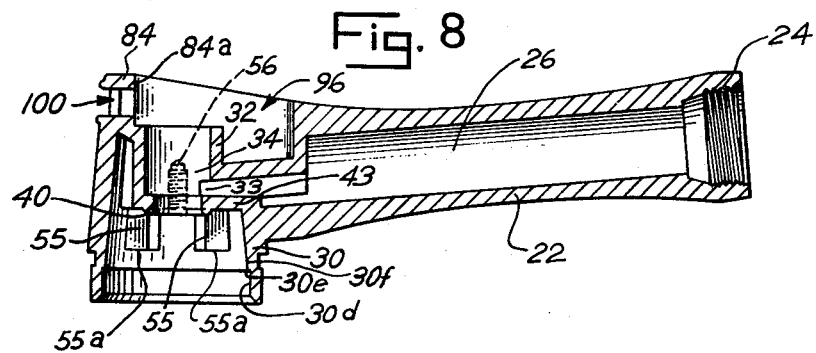
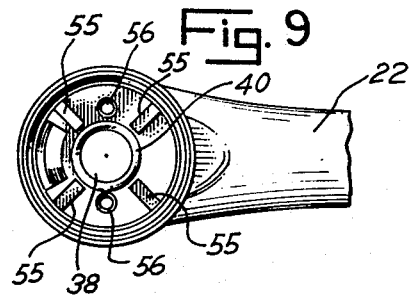
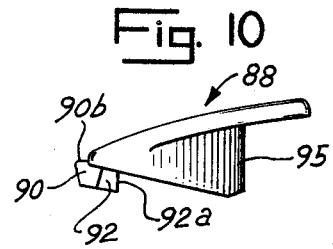
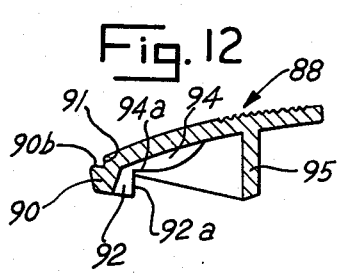
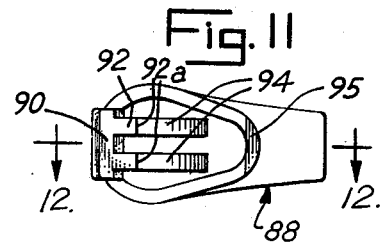
INVENTORS
JOHN F. LOGAN,
HAROLD SHAMES,
BY & SIDNEY J. SHAMES
Barry, Freeman & Molinare
ATTORNEYS United States Patent Office 3,498,546
Patented Mar. 3, 1970

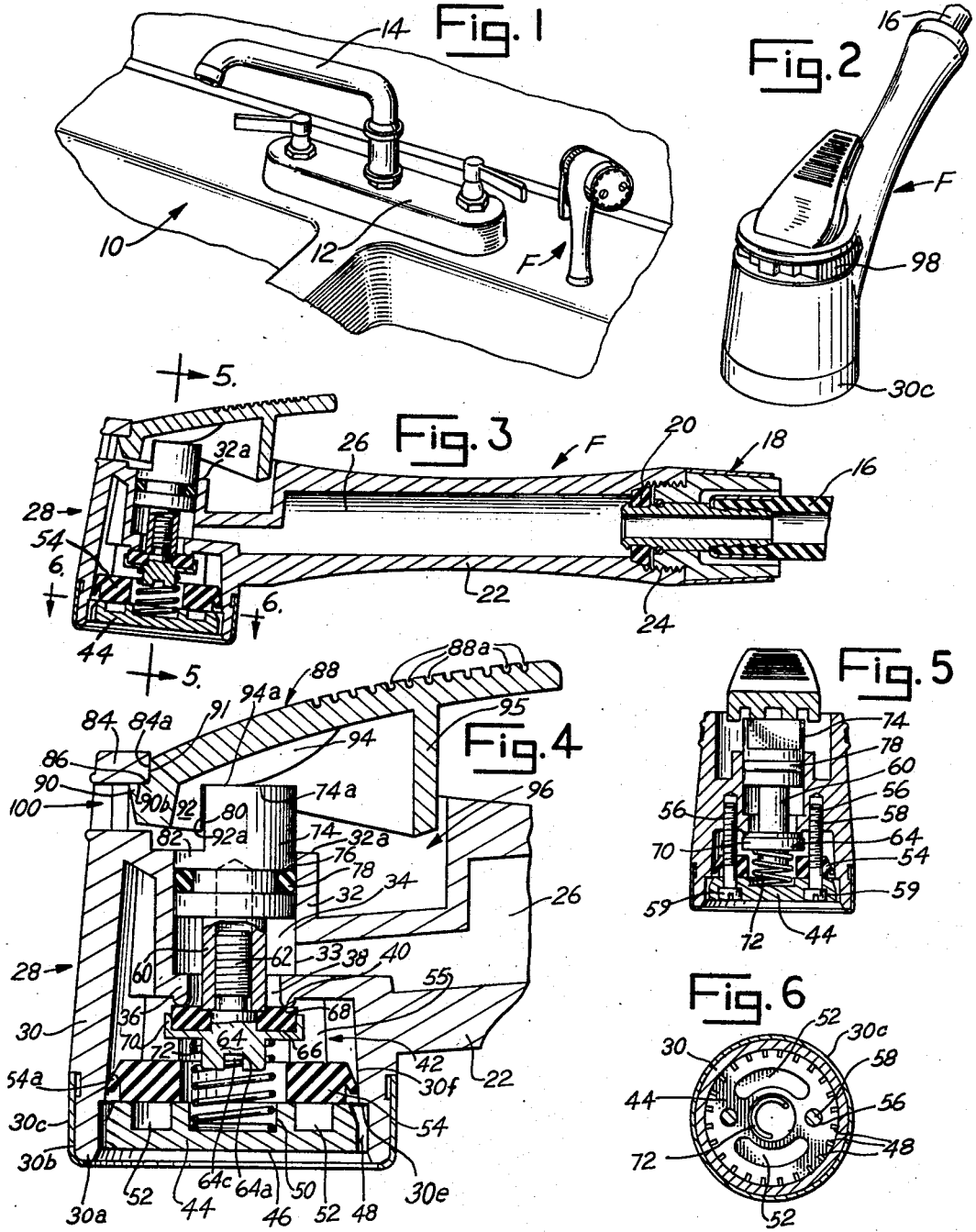

1

3,498,546
SINK SPRAY
John F. Logan, Bronx, and Harold Shames and Sidney
J. Shames, Ardsley, N.Y., assignors to Melard Manufacturing Corp., Bronx, N.Y., a corporation of New York
Filed Mar. 4, 1968, Ser. No. 710,295
Int. Cl. B05b 1/30
U.S. Cl. 239—583          10 Claims

ABSTRACT OF THE DISCLOSURE

An inexpensive faucet spray is provided with major parts of molded plastic so arranged and interconnected as to avoid the usual pivot pin and most other assembly fasteners. The faucet spray delivers multiple streams, does not drip on shut-off, seals with the pressure and requires only minimum force actuation to an on-spray condition. The major parts are a hollow handle with an integral hollow head shell and a flow port therein; a reciprocable valve member arranged to seal the port with differential pressure of the incoming liquid; a second class lever connected to the head shell only through a pivot connection to a shoulder on the head shell and engaging the valve member to actuate same, and the valve member in turn engaging and keeping the lever assembly on the head shell; a spray defining disc carried on the head shell; and anti-drip means between the disc and the flow port. A spring biases the valve member against the lever when liquid pressure is unavailable.

BACKGROUND OF THE INVENTION

This invention relates to a faucet spray, and more particularly to an inexpensive, easily produced spray that is maintained assembled by inter-action between parts normally intended for valving and control operations of the spray.

Faucet sprays are well known products. Prior constructions have left much to be desired in that such constructions have been comparatively expensive, they use pivot pins for their lever control thereby providing a potential point of structural failure, they tend to drip on shut-off, and they sometimes require substantial force to actuate to an on-spray condition.

SUMMARY OF THE INVENTION

One object of this invention is to provide an improved faucet spray which obviates the said problems of existing faucet sprays, and which is characterized by inexpensiveness and simplicity of construction and reliability of operation.

Another object of this invention is to provide an improved faucet spray which seals with the liquid pressure and is operable with a minimum valve opening force, and which will not drip upon shut-off of the spray.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing.

BRIEF DESCRIPTION OF THE DRAWING

FIGURE 1 is a fragmentary perspective view showing a typical environment where a faucet spray, which embodies the invention herein disclosed, would be used;

FIGURE 2 is a front perspective view, somewhat enlarged relative to FIGURE 1, of a faucet spray embodying features of this invention;

2

FIGURE 3 is a longitudinal vertical cross-sectional view of the faucet spray of FIGURE 2;

FIGURE 4 is an enlarged fragmentary cross-sectional view of the head of the faucet spray shown in FIGURE 3;

FIGURE 5 is a cross-sectional view taken on line 5—5 of FIGURE 3;

FIGURE 6 is a cross-sectional view taken on line 6—6 of FIGURE 3;

FIGURE 7 is a top plan view of the integrally molded handle and head shell;

FIGURE 8 is a cross-sectional view taken on line 8—8 of FIGURE 7;

FIGURE 9 is a fragmentary view of the head shell end of the body seen in FIGS. 7 and 8 and is taken looking upwardly relative to FIGURE 8;

FIGURE 10 is a side elevational view of the control lever;

FIGURE 11 is a bottom plan view of the lever seen in FIGURE 10; and

FIGURE 12 is a cross-sectional view taken on line 12—12 of FIGURE 11.

Referring now to the drawings, there is shown in FIG. 1 the typical environment, or installation, in which a faucet spray is to be used. Thus, there is shown a kitchen sink generally indicated at 10, and having a center set 12 from which extends the normal flow spout 14. To the right of the center set 12 is the facuet spray generally indicated at F which is the subject matter of this invention.

As best seen in FIG. 3 the faucet spray F is supplied at its upstream end with fluid from a flexible tube 16 which is secured through an annular connector means generally indicated at 18 to the upstream end of tubular faucet spray F. The connector means is preferably provided with an annular gasket or seal 20 as is well known in the art. What has thus far been described is well known in the art and forms no portion of this invention.

The faucet spray F includes a generally tubular handle or hollow body 22, one end of which is threaded at 24 for connection to the connector means 18. The body 22 is molded of plastic material and is shaped to provide the features that are clearly seen in FIGS. 7–9. The hollow body 22 defines an elongated bore or passageway 26 which at its discharge or downstream end enters a head generally indicated at 28. The head 28 has a generally cylindrical outer wall 30 and a generally cylindrical inner wall 32. There is an opening 33 through the inner cylindrical wall 32 leading to a first chamber 34 surrounded in part by wall 32. Below the first chamber 34, which is arranged to receive liquid under pressure from the liquid source, there is a horizontal wall portion 36 extending inwardly of wall 32 and which serves both to surround a port means 38 and to have formed at its lower edge a raised, rim-like valve seat 40. Located below the valve seat 40 and outwardly thereof, and surrounded by generally cylindrical outer wall 30, is a second or downstream chamber 42 from which liquid under pressure is to be dscharged. A wall 43, lying coplanarly with wall portion 36, serves to separate the flow bore 26 from the downstream chamber 42.

The outer wall 30 extendsd ownwardly below the level of valve seat 40 to a lowermost end 30a and is recessed exteriorly adjacent said lowermost end at 30b so as to receive therein a decorative sleeve of metal or the like 30c that may be spun to the desired shape and which gives a desirable appearance at the lower end or discharge tip of the discharge head 28.

Positioned inwardly of outer wall 30 and above said lowermost edge 30a is a spray defining means that is carried in position on the spray head and which serves in part to partially bound the downstream, or second, chamber 42. The spray defining means is in the form of a molded disc 44 having a flat outer face 46 and providing peripheral edges which are notched as at 48 so that when the disc 44 is in its position as seen in FIG. 4, with its upstream end abutting ridge 30e, the notches 48 in the disc cooperate with the inner periphery 30d of wall 30 to define flow passageways at the downstream end of chamber 42 and through which water is caused to pass so as to issue as jets from head 28. The notches 48 are radially enlarged at their upstream ends at 48a to insure that notches 48 downstream of ridge 30e flow full. The disc has a central upstream recess 50 and a pair of arcuate recesses 52 formed on the rear face.

Positioned upstream of the disc 44 and in engagement with said disc is an annular disc-like rubber member 54 shaped to provide on the outer periphery thereof an outwardly biased flexing flange 54a which is normally inherently biased outwardly into sealing engagement with the inner surface 30f of the outer wall 30. Within the second chamber 42 there are four generally equally spaced upright ribs 55, as best seen in FIGS. 8 and 9, which extend generally radially inwardly from wall 30 but terminate at their inner ends in spaced relation to the annular valve seat 40. The lowermost edges 55a of the ribs 55 are located substantially in a horizontal plane spaced above the disc 44, and said lowermost edges 55a of the ribs 55 are adapted to have the uppermost or upstream side of the disc-like resilient member 54 abut thereagainst.

Also formed in the head 28 are a pair of tapped recesses 56 located diametrically, as best seen in FIGS. 5 and 9, and which are adapted to receive thereinto a pair of threaded assembly bolts 58 which operate to extend through and assemble the disc 44 and the rubber disc 54 in position in the head 28. Counterbored recesses 59 are provided in the outer face of disc 44 to accommodate the heads of bolts 58.

The resilient disc 54 is molded and constructed so that the annular flange 54a normally provides a sealing pressure against inner wall 30f. At the same time, the recess underflange 54a permits flexing of the flange 54a away from wall 30f to permit water flow therepast. The arcuate recesses 52 in the back face of the disc 44 provide relief spaces into which some of the material of disc 54 may flow if the disc 54 is pressurized, thereby accommodating the pressure that may be built up when the bolts 58 are tightened.

The head 28 contains a valve means for controlling the flow of liquid such as water through port means 38. Thus, there is provided a central tubular stem member 60 which is threaded to cooperatively receive the threaded shank 62 of a headed member 64 which is annularly cupped or recessed at 66 to accommodate in such recess an annular sealing ring or gasket 68. Head 64 is provided with an annular peripheral flange 70 which serves to confiine the annular gasket or valve member 68. The head 64 is shaped to extend downwardly of the cupshaped portion 66 to form a central stud that serves to center the upper end of an elongated coil spring 72. The lower end of coil spring 72 extends through the central bore of disc 54 to be positioned and confined in the central recess 50 of the disc member 44. The underside of head 64 is slotted at 64a to provide a means to receive a tool such as the bit of a screw driver for purposes of tightening shank 62 into stem 60.

The stem 60 extends upwardly through port means 38 in spaced relation to wall member 36. Stem 60 connects to, or as shown is integral with a cylindrical piston member 74 which has an annular recessed groove 76 in which is positioned an O ring type sealing ring 78 in sliding and sealing engagement with the inner surface of the inner annular wall 32. The piston 74 is generally cylindrical except that one uppermost portion thereof is cut away to provide an upright face 80 that is flat and is located as a chord of the cylindrical periphery of piston 74.

The lower end of wall 80 terminates at a transverse or horizontal shoulder 82. The shoulder 82 is located generally in the same plane as the upper end 32a of the inner wall 32 when the parts are in position as in FIG. 4.

Means are provided on the head 28 and above piston 74 for selectively actuating the valve means. Thus, on the forwardmost or leading end of handle body 22 and just above outer wall 30 there is provided a fulcrum means that includes a top bar 84 integral with body 22 but providing an abutment or fulcrum-type shoulder 86 on the underside thereof spaced from the remainder of head 28. An elongated lever 88 is provided at one end thereof with a lip 90 which is arranged to engage fulcrum shoulder 86. Abutment edge 91 may be arranged to engage edge 84a on bar 84 when the valve means is closed as in FIG. 4. A central underside portion of lever 88 has formed thereon flange means 92 with edges 92a thereof arranged to abut upright face 80 on piston 74 when the valve is closed as seen in FIG. 4. The central portion of lever 88 also has a cam means 94 defined thereon and positioned to engage the top face 74a of piston 74.

The elongated lever 88 extends rearwardly of bar 84 in general longitudinal alignment with handle 22 and spaced above said handle, so that the other end of the lever is exposed for manual engagement and may be easily manipulated by thumb pressure. The outer surface of lever 88 has a series of depressions 88a thereon to define spaced ridges for better manual engagement than with a smooth surface.

The lever 88 has a downwardly extending peripheral flange 95 that reinforces the lever, shields the piston 74, and serves as a stop to engage the handle 22 and limit downward movement of the lever and hence limit movement of the valve member 68 from valve seat 40. The upper forward end of handle 22 is recessed at 96 to accommodate the flange 95 during the range of movement of lever 88. A shield piece 98 may be fastened on head 28 by glue or the like to cover the space 100 defined between bar 84 and head 28.

The cam means 94 on a central portion of lever 88 has at its forwardmost end a flat segment 94a that engages top 74a of piston 74. This flat segment lies in a plane parallel to and spaced a very slight distance below the upper edge 90b of lip 90 that engages fulcrum shoulder 86, that is in the direction toward valve seat 40. The arrangement of abutting surfaces on the various parts including lever 88, bar 84, and piston 74 is such that two surfaces on each of the lever and valve member engage each other substantially simultaneously so as to substantially avoid wobble of the lever and lost motion in lever 88 once assembled, and said lever 88 will not be inadvertently disengaged from its assemblage on bar 84. Thus, no assembly bolts or fasteners are needed on lever 88.

The cross-sectional area of piston 74 exposed to incoming water pressure in chamber 34 is selected to be greater than the annular area through port means 38 surrounding stem 60, so that the differential of pressures derived from the incoming water in first chamber 34, upwardly against piston 74 and downward against valve disc 68, tends to normally maintain the valve means closed. When the lever 88 is selectively depressed, only slight or minimal manual pressure is needed to cause resilient gasket 68 to be unseated from valve seat 40 and liquid enters chamber 42. The shape of cam means 94 is such that greater depression of lever 88 depresses piston 74 a greater amount and opens the valve for greater flow therethrough. The pressure of water in chamber 42 upstream of disc 54 causes sealing flange 54a to be deflected and move away from cylindrical wall 30f and water is discharged through the jet forming means including notches 48. When pressure on lever 88 is released, the increased differential pressure on piston 74 coupled with bias of spring 72 closes the valve. With the valve closed, flange 54a on disc 54 closes to prevent dripping from the spray head. The spring 72 also operates to hold the parts assembled by biasing the valve member and piston against the lever 88 to hold lip 90 against fulcrum shoulder 86.

While there has been shown and described a particular embodiment of this invention, it will be obvious to those skilled in the art that various changes and modifications may be made therein without departing from the invention.

What we claim as new and desire to secure by Letters Patent of the United States is:

1. A spray head comprising, in combination: body means defining a first chamber arranged to receive liquid under pressure, a second chamber from which liquid under pressure is to be discharged, and port means between said chambers; spray defining means carried by said body means and bounding in part the downstream boundary of said second chamber; valve means for selectively controlling flow of liquid from the first chamber to said second chamber through said port means; and seal means within said second chamber upstream of the spray defining means for preventing drip of liquid through said spray defining means when the port means is closed.

2. In a spray device of the type having a hollow handle through which pressured liquid is supplied, a head on the handle from which a spray of liquid is to be discharged, a downstream-facing valve seat in said head, and a lever-type control means for selectively permitting discharge of liquid from the head, the improvement comprising, in combination, a reciprocable valve member in said head positioned to move toward and away from said valve seat, means defining a fulcrum-type shoulder on the handle spaced from the valve member and facing in the same direction as said valve seat, an elongated lever having at one end thereof a lip that faces in a direction opposite that of the shoulder and which is caused to contact the fulcrum-type shoulder, cooperating means on the lever and valve member for preventing transverse displacement of the lever lip relative to the fulcrum-type shoulder, the other end of the lever being exposed for manual engagement to actuate the lever, and a central portion of the lever being positioned to engage and move the reciprocable valve member.

3. A device as in claim 1 wherein said second chamber is defined in part by a cylindrical wall upstream of the spray defining means, and the seal means includes a flange of resilient material biased to normally sealing engage said cylindrical wall but being deflectable inwardly away from said wall by liquid pressure against the upstream side of said flange.

4. A device as in claim 1 wherein the valve means includes a valve seat at the downstream end of the port, a valve disc for engaging the valve seat and exposed to the normal pressure of liquid tending to unseat the valve disc, pressure balancing means cooperating with the valve disc for overcoming the liquid pressure and to normally bias the valve disc closed but requiring only minimal exterior opening force to unseat the valve disc, and a lever for selectively moving the valve disc away from the valve seat.

5. A device as in claim 1 wherein the spray defining means is in the form of a disc whose edge is shaped to define the nature of the spray issuing from the spray head, the seal means being in the form of a resilient annulus abutting the upstream side of the spray defining disc and having an outwardly biased flexing flange, and means securing the spray defining disc to the body means in spaced relation to said valve means.

6. A device as in claim 2 including means biasing the valve member against the lever for preventing the lip from becoming disengaged from the fulcrum-type shoulder.

7. In a spray device of the type having a hollow handle through which pressured liquid is supplied, a head on the handle from which a spray of liquid is to be discharged, a valve seat in said head, and a lever-type control means for selectively permitting discharge of liquid from the head, the improvement comprising, in combination, a reciprocable valve member in said head positioned to move toward and away from said valve seat, means defining a fulcrum-type shoulder on the handle spaced from the valve member, an elongated lever having at one end thereof a lip engaging the fulcrum-type shoulder, the other end of the lever being exposed for manual engagement to actuate the lever, and a central portion of the lever being positioned to engage and move the reciprocable valve member, and said valve member being constructed so that pressurized liquid in the spray device normally biases the valve member against the lever, and including a spring biasing the valve member against the lever to maintain the lever assembled on the head even when pressurized liquid is not available.

8. In a spray device of the type having a hollow handle through which pressured liquid is supplied, a head on the handle from which a spray of liquid is to be discharged, a valve seat in said head, and a lever-type control means for selectively permitting discharge of liquid from the head, the improvement comprising, in combination, a reciprocable valve member in said head positioned to move toward and away from said valve seat, means defining a fulcrum-type shoulder on the handle spaced from the valve member, an elongated lever having at one end thereof a lip engaging the fulcrum-type shoulder, the other end of the lever being exposed for manual engagement to actuate the lever, and a central portion of the lever being positioned to engage and move the reciprocable valve member, and there being two surfaces on each of said lever and valve member arranged at an angle relative to each other and positioned to substantially simultaneously engage to provide two pairs of engaging surfaces which eliminates substantial wobble and lost motion in the lever.

9. A device as in claim 2 wherein the central portion of the lever that engages the valve member when the valve disc is seated lies in a plane spaced slightly from the fulcrum-type shoulder on the handle in the direction toward the the valve seat.

10. A device as in claim 2 including cooperating elements on the lever and head serving as stop means for limiting movement of the lever and thus movement of the valve member away from the valve seat.

References Cited

UNITED STATES PATENTS

| | | | |
|---|---|---|---|
| 3,030,033 | 4/1962 | Rosenkranz | 239—583 X |
| 3,072,342 | 1/1963 | MacFarland | 239—583 |
| 3,149,761 | 9/1964 | Harris et al. | 222—402.13 |
| 3,224,645 | 12/1965 | Frost | 222—402.13 |
| 3,365,138 | 1/1968 | Green | 222—494 X |

SAMUEL F. COLEMAN, Primary Examiner

H. S. LANE, Assistant Examiner

U.S. Cl. X.R.

222—571

UNITED STATES PATENT OFFICE
CERTIFICATE OF CORRECTION

Patent No. 3,498,546  March 3, 1970

John F. Logan et al.

It is certified that error appears in the above identified patent and that said Letters Patent are hereby corrected as shown below:

In the heading to the printed specification, line 4, "assignors" should read -- said Logan assignor --.

Signed and sealed this 22nd day of December 1970.

(SEAL)
Attest:

Edward M. Fletcher, Jr.  WILLIAM E. SCHUYLER, JR.
Attesting Officer  Commissioner of Patents